2,991,181
CEREAL AND METHOD OF MAKING SAME

Allie C. Benjamin, Little Falls, N.Y., assignor, by mesne assignments, to Salada-Shirriff-Horsey, Inc., Boston, Mass., a corporation of Delaware
No Drawing. Filed May 29, 1958, Ser. No. 738,630
2 Claims. (Cl. 99—83)

This invention relates to farinacous foods and has for its principal object the provision of a firm body cereal of improved texture which gives a clean break when cut with a spoon, does not stick to the spoon, remains moist while being eaten, and is neither gummy nor tacky.

Another object of the invention is to provide an improved process for making a more palatable and nutritious food by using a combination of cereal grains and other elements in such proportions as to give an optimum level of protein consistent with requirements for growth and tissue repair and with the various amino acids present in proper ratio.

A further object of the invention is to provide a dry cereal food product which when stirred with warm milk and allowed to stand a few minutes will yield a food especially suited for feeding babies as it is free of the tendency of most pre-cooked baby cereals now available to thicken on standing.

A still further object of the invention is to provide a pre-cooked, dry cereal food product containing rennet and which when added to warm milk forms a cereal in which the characteristic drying out of similar foods is eliminated as the rennet action on the milk forms a clot which locks in the water, thus controlling its absorption by the starch of the grain, whereby the particles of cereal are uniformly held in suspension by the clot. Further rennet action on the clot shrinks and squeezes out the liquid within the clot, the starch of the grain promptly absorbing the liquid so the food is still moist and homogeneous but not pasty after standing for hours.

In the description and claims the word "cereal" is used in its most popular sense; that is, to refer to the food which is eaten. The expression "cereal grain" will apply to wheat, rice, soy, oats, barley, etc. The expression "cereal product" will be used to denote the material which is sold in packages and to be used with milk to form the cereal.

Although over twenty-four different amino acids ordinarily are required for synthesis of tissue proteins and the absence of any one of them could prevent the formation of the polypeptide, there are only eight that cannot be synthesized in the human body for metabolic needs, these being called the essential amino acids which must be provided daily in proper amounts and proportions in the diet.

The experiments by many renowned nutritionists over a period of several years, leading to the present invention, were based on the thought that the amino acids must be supplied to the baby in amounts and proportions required for growth and for the building and repair of tissue. Any protein food consumed beyond this would either be wasted or would merely add body weight without in any way increasing the strength, vitality, resistance to disease or mental growth of the child. To have such a food in the nature of a cereal also required that for greatest success it should be palatable, attractive in looks, easily prepared, and not require alteration during the feeding period, as by further addition of milk, for example, milk naturally being the basis of the food. Of the cereal grains it was found that rice and soya could most easily be combined in such fashion that a balanced amino acid pattern, as for example exists in cow's milk, would be provided so that with a few other ingredients, each with its own special usefulness, an approximation of the ideal cereal food could be produced.

It has been determined that a suitable amino acid pattern can best be obtained by keeping within certain critical limits. For example, in the preferred rice-soya cereal product the percentage of rice to soya should be between 86% rice to 14% soya and 72% rice to 28% soya with an optimum ratio of 79% rice to 21% soya. While a variation above or below the ratios stated would not be harmful to the product or to the child eating the cereal, it definitely would tend to throw the amino acid pattern out of balance and to prevent the obtaining of the results secured with the preferred pattern.

As an explanation, it might be noted that rice flour is low in certain of the amino acids while high in others of the eight amino acids generally considered essential to human nutrition. Soy flour is high in amino acids which are low in rice flour and is low in those amino acids which are abundant in rice flour. Thus a proper combinaton of the two flours will furnish a suitable balance of the amino acids when used within the ratios stated. Since rice flour has a protein content of from 6% to 9% while soy flour has a protein content of from 50% to to 52%, the higher the proportion of rice flour, the lower will be the protein level of the mixture, and the greater the proportion of soy flour, the higher the protein level. The following table shows the amino acid content of rice and soy flours expressed in grams of the eight amino acids per kilogram of protein:

TABLE I

*Amino acid content*

|  | Grams per kilogram of protein | |
|---|---|---|
|  | Rice | Soy |
| Iso-Leucine | 52 | 53 |
| Leucine | 86 | 77 |
| Lysine | 38 | 63 |
| Methionine | 23 | 14 |
| Phenylalanine | 49 | 49 |
| Threonine | 39 | 40 |
| Tryptophan | 10 | 14 |
| Valine | 66 | 52 |

The moisture content of the cereal product is also fairly critical as it should not be greater than 11% nor less than 5%, with an optimum of 7%. If the moisture in the cereal product is below 5%, the product becomes stale and rancid on long storage and this tendency to become stale increases rapidly below the critical point of 5%. If the moisture content is above 11%, the growth of mold or bacteria is promoted, but near the 7% optimum the cereal product may be stored for appreciable periods of time without becoming stale or showing mold growth.

Briefly, the process of making the cereal product and the cereal is as follows: Chosen flours as stated in the examples are mixed with water in a mixing tank, preferably but not necessarily with heating to a temperature of about 150° F. An amylase enzyme may then be slurried in water and added to the flours. The amylase, while optional, makes the process easier to control and does make the cereal somewhat smoother while being eaten. The advantage of heating the flour and water mixture before adding the enzyme is that this pre-heating makes it easier to handle the mix on the dryer. This slurry is then heated to a temperature between 130° and 200° F. to cause gelatinization of a part of the starch, which occurs between 130° and 175°. The enzyme, preferably diastase although rhozyme or pangestin may be used, acts upon this gelatinized starch to change it into sugar, dextrins and polysaccharides. The exact temperature, which for example is 155° with a rice-soya content of 18%, depends not only on the type of cereal used but on the quantity of solids in the slurry, the higher the percentage of solids the lower the temperature required.

The degree of breakdown of the starch is controlled by the quantity of amylase and the duration and temperature of the heating. The usual time required is from 10 to 20 minutes. The amylase is destroyed by heat at 190° F., thus stopping the reaction. Various mineral salts and vitamins may be added, either before or after the amylase enzyme is added. As stated, the cereal product can also be manufactured without using the amylase enzyme, as will be shown in one of the detailed examples, the presence or absence of the enzyme having no effect on the custard-like texture of the cereal.

The heated slurry is then pumped onto a drum dryer which may be either a single or double drum and which may be either atmospheric or vacuum jacketed. The product is here further cooked and dried. This further heating causes a gelatinization of the remaining starches of the flours so that they will more readily absorb water. With the 18% solid content just mentioned, the drums would be heated to about 290° F. and be revolved at five or six revolutions per minute, the cooking requiring about 15 minutes, during which the temperature of the mixture never gets above 200° F., its boiling point. Subsequent drying in a thin layer needs only about ten seconds after which the product is passed through a flaker and is reduced to discrete particles.

A special rennet mixture is prepared to be mixed with the cereal portion of the product, by first making an emulsion of sugar, gum arabic, and water and adding to this additional sugars together with rennet and a calcium salt such as the acetate. The sugars are all sucrose, never dextrose. It is preferred that the sugars shall be of at least three different grinds in order to obtain the proper particle size to insure that the sugars and the cereal portion shall remain homogeneous after being packaged. No. 2 industrial sucrose can be used but it is appreciably better to mix the sugars in proper ratio as for example: fine granulated, 41 parts; bakers' special, 44 parts; and pulverized (6x) 15 parts. One part of the special rennet mixture may be mixed with as much as twenty parts of the cereal, the preferred proportion being one part special rennet mixture to four parts of the cereal portion of the product. The quantity of rennet for a given amount of the cereal product, however, is the same regardless of the ratio of the cereal product to the special rennet mixture used. After the cereal portion is mixed with the special rennet portion the product is in condition for packaging, usually in small boxes.

In using the cereal product, four level tablespoons of the product thus made is mixed with half a cup of milk which is at a temperature of about 110° F. The milk should be stirred for one minute after the cereal product is added and then stands for another minute or so to give the rennet plenty of time to set the milk. The cereal prepared in this manner exhibits none of the expected gumminess but surprisingly cuts sharp and clean, much as does a custard. The cereal possesses a fine, highly acceptable texture and an excellent body which does not dry out or become pasty on standing. The cereal remains homogeneous without the continued stirring required with earlier cereals.

*Example I.*—In this experiment which was a very early one, giving an improved product but not exactly what was wanted, the rennet extract was mixed with a small quantity of water and applied directly to the cereal portion which consisted of:

|  | Parts |
|---|---|
| Rice flour | 160 |
| Soya flour | 31 |
| Dicalcium phosphate | 7 |
| Sodium chloride (common salt) | 1.75 |
| Iron pyrophosphate | .25 |
| Water | 800 |
|  | 1000.00 |

The ingredients were slurried with the water, heated to 150° F., pumped onto a double drum atmospheric dryer where they were cooked and dried. The calcium and iron salts were to fortify with calcium and iron and to maintain a proper ratio of calcium to phosphorus, i.e. about 6:5. The sodium chloride was purely for flavor. After flaking the cereal portion was mixed with a special rennet mixture which was made as follows: 500 cc. of rennet extract, 500 cc. of water and 275 grams of calcium acetate mixed together until the calcium acetate was dissolved. The resulting solution was then applied to 100 pounds of the cereal portion after which the excess moisture was removed by drying. The product was then in condition for packaging for the final purchaser or user.

The product thus made was tested by mixing with milk as stated in the general outline and the cereal was found to possess a light, creamy appearance, acceptable texture but a somewhat weak body. The protein level was a little low. The cereal exhibited none of the expected gumminess but surprisingly cut sharp and clean.

*Example II.*—In this experiment one part by weight of special rennet mixture was added to four parts of rice-soya mixture, the grain portion comprising:

|  | Parts |
|---|---|
| Rice flour | 151 |
| Soya flour (low fat) | 40 |
| Dicalcium phosphate | 7 |
| Sodium chloride (common salt) | 1.75 |
| Iron pyrophosphate | .25 |
| Water | 800 |
|  | 1000 |

The ingredients were slurried with the water, heated to 150° F., pumped into the "pinch" of a double drum atmospheric dryer where they were cooked and dried. After flaking the cereal portion was mixed with the special rennet mixture which was made as follows: 1596.3 gms. of finely granulated sugar and 798.1 grams of gum arabic were mixed with 1025 grams of water and blended for about one hour until smooth. To this emulsion was then added 92.399 pounds of sugar, to which was added 117.0 grams of rennet powder and 936.2 grams of calcium hypophosphite. All of these were mixed well until nicely blended, which required only about five minutes. The mixture was then dried, comminuted, and mixed with the cereal powder as stated. The product was then in condition for packaging for the final purchaser or user.

The product thus made was tested by mixing with milk as stated in the general outline and the cereal was found to possess a light, creamy appearance, excellent texture and body which did not dry out or become pasty on standing. As in Example I, the cereal exhibited none of the expected gumminess but surprisingly cut sharp and clean.

*Example III.*—In this experiment one part by weight of special rennet mixture was added to four parts of rice-soya mixture. The grain portion was similar to that of Example II but diastase was used.

The rice and soya flours were first slurried with the water and diastase was added in the ratio of 0.33 gram per pound of the flours. The other ingredients were added, heated to 155° F., cooked and dried. The rennet mixture was then added as in Example II.

The product thus made was tested by mixing with milk as stated in the general outline and the cereal was found to be quite similar to the cereal of Example II except that it was somewhat smoother.

*Example IV.*—In this experiment one part by weight of special rennet mixture was added to twenty parts of rice-soya mixture. The grain portion was manufactured exactly the same as in Example III. After flaking, the cereal protein was mixed with a special rennet mixture which was made as follows: 65.76 pounds of finely granulated sugar and 177.76 grams of gum arabic, 666.7 grams of rennet powder were mixed with 32.39 pounds (3.89 gallons) of water and blended for about 30 minutes until smooth. This special rennet mixture was then mixed with the cereal powder as stated. After removal of excess moisture, the product was then in condition for packaging for the final purchaser or user.

The product thus made was tested by mixing with milk as stated in the general outline and the cereal was found to be the same as that in Example III.

*Example V.*—In this example oat flour and torula yeast were used in place of the rice and soya flours, the ratio being 171:20. The process followed the general outline and the product, when mixed with milk, gave a cereal only slightly different in appearance, texture, and flavor from those in Examples II, III, and IV and having the recited advantages.

*Example VI.*—In this case the rice flour was omitted in favor of corn flour. The soya flour was retained but in smaller proportion and rice bran or rice polish was added so that the ratio or number of parts was 111:40:40.

*Example VII.*—In this case barley flour was used with soya flour and rice bran or rice polish, the ratio being 120:31:40.

*Example VIII.*—In this case wheat flour was used with soya flour and rice bran or rice polish, the ratio being 130:40:21.

The products of Examples VI, VII, and VIII were tested by mixing the milk as stated in the general outline and the cereal in each case was found to possess a fine, highly acceptable texture and excellent body which did not dry out or become pasty on standing. The cereals exhibited none of the expected gumminess but surprisingly cut sharp and clean, much as does a custard, and while naturally differing in flavor had the desirable features of the cereals of Examples II and III.

Many other experiments were made following generally the lines of these examples and they indicate that with the various cereal combinations stated below, the lower limits, the best (optimum) results, and the upper limits are as follows:

| Cereal Combination | Lower Limit | Optimum | Upper Limit |
|---|---|---|---|
| Rice flour: soya flour | 164:27 | 151:40 | 137:54 |
| Oat flour: torula yeast | 188:3 | 171:20 | 160:31 |
| Corn flour: soya flour: rice bran or polish | 131:20:40 | 111:40:40 | 101:50:40 |
| Barley flour: soya flour: rice bran or polish | 140:11:40 | 120:31:40 | 111:40:40 |
| Wheat flour: soya flour: rice bran or polish | 96:15:80 | 130:21:40 | 100:41:50 |

What I claim is:

1. The method of making a pre-cooked dry cereal product which when stirred into warm milk will yield a food especially suited for feeding babies, being free of the tendency to thicken on standing; said method comprising mixing with water, rice flour and soya flour in a ratio between 86% rice flour to 14% soya flour and 72% rice flour to 28% soya flour, heating the mixture to a temperature between 130° F. and 190° F. for from ten to twenty minutes, then cooking the heated mixture at about 290° F. for approximately fifteen minutes, drying the cooked mixture in a thin layer, flaking, preparing an emulsion of gum arabic, sugar, and water, adding to the emulsion a vastly greater quantity of additional sugar and rennet powder, blending, drying, comminuting and mixing with said flaked cereal powder, said additional sugars being sucrose sugars of at least three different grinds to obtain the proper particle size to insure that the sugars and the cereal portion shall remain homogeneous after being packaged.

2. The method of claim 1 in which the moisture content of the dry cereal product is held within the limits 5% to 11%.

References Cited in the file of this patent

UNITED STATES PATENTS

| | | |
|---|---|---|
| 1,773,296 | Block | Aug. 19, 1930 |
| 1,990,329 | Johnson et al. | Feb. 5, 1935 |
| 2,418,847 | Musher | Apr. 15, 1947 |
| 2,727,822 | Kimball | Dec. 20, 1955 |